US009716966B2

(12) United States Patent
Folk

(10) Patent No.: US 9,716,966 B2
(45) Date of Patent: Jul. 25, 2017

(54) SYSTEM AND METHOD FOR COMMUNICATING GRAIN BIN CONDITION DATA TO A SMARTPHONE

(71) Applicant: IntraGrain Technologies Inc., Regina (CA)

(72) Inventor: Kyle Folk, Regina (CA)

(73) Assignee: INTRAGRAIN TECHNOLOGIES INC., Regina, Saskatchewan (CA)

( * ) Notice: Subject to any disclaimer, the term of this patent is extended or adjusted under 35 U.S.C. 154(b) by 0 days.

(21) Appl. No.: 15/149,269

(22) Filed: May 9, 2016

(65) Prior Publication Data

US 2016/0330270 A1 Nov. 10, 2016

(51) Int. Cl.
| H04M 3/00 | (2006.01) |
| H04M 1/00 | (2006.01) |
| H04B 1/38 | (2015.01) |
| H04W 4/00 | (2009.01) |
| H04M 1/725 | (2006.01) |

(52) U.S. Cl.
CPC ........ *H04W 4/005* (2013.01); *H04M 1/72527* (2013.01)

(58) Field of Classification Search
CPC ....... H04L 67/06; H04L 67/025; G01B 11/24; G01B 11/245; G01B 21/20; H04M 1/72519; H04M 1/72527
USPC .......................................... 455/418–420, 557
See application file for complete search history.

(56) References Cited

U.S. PATENT DOCUMENTS

| 8,806,772 B1 * | 8/2014 | Schaefer, Jr. ........... F26B 21/12 34/491 |
| 2004/0031335 A1 * | 2/2004 | Fromme ................. G01B 11/24 73/865 |
| 2008/0080703 A1 * | 4/2008 | Penning ............ H04M 1/72502 379/428.02 |
| 2013/0226357 A1 * | 8/2013 | Ersavas .................... A01G 1/00 700/284 |
| 2013/0269832 A1 * | 10/2013 | Gengerke ................. B65B 1/32 141/95 |
| 2014/0046611 A1 * | 2/2014 | Bloemendaal ....... G01N 27/223 702/65 |
| 2014/0102175 A1 * | 4/2014 | Wasden ................. G01K 13/02 73/29.02 |
| 2014/0250717 A1 * | 9/2014 | Bloemendaal ............ F26B 3/06 34/487 |

(Continued)

*Primary Examiner* — Simon Nguyen
(74) *Attorney, Agent, or Firm* — Ryan W. Dupuis; Kyle R. Satterthwaite; Ade & Company Inc.

(57) ABSTRACT

Sensed conditions are communicated from a cable sensing array suspended in one or more grain storage bins using an adapter which includes a port for making a wired connection with a cable output of the cable sensing array. The adapter further includes a sensor receiver in connection with the port to receive sensed conditions from the cable sensing array, and an interface. In a preferred embodiment, the interface forms a wired connection with a headphone jack of a smartphone. A program executable on the smartphone communicates a sampling instruction from the smartphone to the adapter through the interface to cause the adapter to retrieve the sensed condition data from the sensing array and transmit the sensed condition data back to the smartphone. The program on the smartphone may include further instructions to transmit the data over a wireless network to a remote server for access by internet enabled devices.

15 Claims, 3 Drawing Sheets

(56) References Cited

U.S. PATENT DOCUMENTS

2015/0177114 A1* 6/2015 Kapoor ............... G01B 21/20
                                                    702/128
2016/0094906 A1* 3/2016 Keskin ............... H04R 1/1041
                                                    381/74

* cited by examiner

SYSTEM AND METHOD FOR COMMUNICATING GRAIN BIN CONDITION DATA TO A SMARTPHONE

This application claims foreign priority benefits from Canadian Patent Application 2,891,018, filed May 7, 2015.

FIELD OF THE INVENTION

The present invention relates to data communication system for communication between a condition sensor array comprising at least one condition sensor received within an agricultural storage bin for sensing a condition at a respective location of the condition sensor and a mobile computer device, for example a smartphone.

BACKGROUND

It is known to be desirable to monitor the condition of various assets in agricultural industries. In one example when grains are stored in storage bins, it is particularly desirable to monitor the heating of the contents of those bins to avoid spoilage of the grain, and resulting diminished quality of the grain. Moisture can also contribute to spoilage and is also desired to be monitored. Additional conditions such as carbon dioxide content are also occasionally monitored to detect conditions which might be indicative of spoilage.

A common method of monitoring within a grain storage bin is to provide a condition sensor array in the form of one or more cables which are vertically suspended within the grain bin and which support condition sensors at vertically spaced apart positions along the cable at designated heights. The cable incorporates a data communication wire in communication between all of the sensors along the cable and an output end of the cable typically located externally of the bin within reach of an operator standing on the ground beside the bin.

One known method for retrieving the data is to make use of a handheld grain temperature monitoring device available by OPI Systems Inc., under the trade name StorMax™. The handheld monitoring device is a dedicated unit including an internal processor and a display which is intended to be connected to the output end of the cable for reading sensed conditions from the cable and either storing or displaying the data on the handheld unit. A subsequent connection is required between the handheld device and a personal computer of the operator in order to transfer data. The dedicated use of the hardware forming the handheld device is limited to its use with sensor cables such that it is a costly accessory. Furthermore, the device is time consuming and awkward to use where it is desired to simply record the data on a personal computer.

SUMMARY OF THE INVENTION

According to one aspect of the invention there is provided a data communication system for communication between a mobile computer device and a condition sensor array comprising at least one condition sensor received within an agricultural storage bin for sensing a condition at a respective location of the condition sensor, the system comprising:

an adapter comprising:
  a portable housing;
  a port on the housing for making a wired connection to the condition sensor array;
  a sensor receiver in connection with the port for communicating with said at least one condition sensor of the sensor array when the port forms a wired connection with the condition sensor array;
  an interface on the housing for communicating with the mobile computer device; and
  a controller which is operatively connected to:
    i) the sensor receiver for retrieving the sensed condition data from said at least one condition sensor through the sensor receiver; and
    ii) the interface for receiving instructions from the mobile computer device and for transmitting the sensed condition data from the controller to the mobile computer device; and
  a program loadable onto the mobile computer device and including a set of instructions, that when executed by the mobile computer device, causes the mobile computer device to instruct the controller of the adapter to retrieve the sensed condition data from said at least one condition sensor and to transmit the sensed condition data to the mobile computer device.

According to a second aspect of the present invention there is provided a method of communicating between a mobile computer device and a condition sensor array comprising at least one condition sensor received within an agricultural storage bin for sensing a condition at a respective location of the condition sensor, the method comprising:

providing an adapter comprising a portable housing, a communication port capable of forming a wired connection with the condition sensor array, a sensor receiver in connection with the port, an interface on the housing, a controller which is operatively connected to sensor receiver and the interface;

providing a program loadable onto the mobile computer device that includes a set of instructions executable by the mobile computer device;

forming a wired connection between the communication port of the adapter and the condition sensor array;

executing the program on the mobile computer device so as to communicate a sampling instruction from the mobile computer device to the controller of the adapter through the interface; and using the controller of the adapter, retrieving the sensed condition data from said at least one condition sensor through the communication port and transmitting the sensed condition data from the controller to the mobile computer device using the interface in response to said sampling instruction from the mobile computer device.

The use of an adapter which communicates with the condition sensor array by a simple wired connection and which is further responsive to instructions from a program or application executable on a mobile computer device, can thus make use of an existing smartphone of the user and minimize the requirement of the user to purchase costly dedicated monitoring hardware. The process of transferring sensed condition data from the condition sensor array to a mobile computer device of the user can thus be accomplished with a simple low cost adapter device. Furthermore, the connection specifically to a mobile computer device allows enhanced functionality as the data can be readily displayed on the device on site, or data can be stored locally on the mobile computer device, or yet further, the data can be transferred by the mobile computer device to an internet base cloud storage to provide subsequent access to the data from any internet enabled computer device. The adapter according to the present invention together with the application executable on a smartphone provides increased accessibility to the sensed condition data, with more storage capacity, using simpler, lower cost hardware to enable the data transfer.

When the sensor array comprises a cable suspended within the agricultural storage bin having a plurality of the condition sensors supported thereon and a connector at an output end of the cable in communication with each of the condition sensors, preferably the port on the housing of the adapter is arranged for mating connection with the connector of the sensor array.

When the sensor array comprises a plurality of the condition sensors, each having a respective sensor identification, preferably the controller is arranged to retrieve the respective sensor identification in association with each sensed condition of the sensor condition data.

When the sensor array comprises a plurality of cables suspended within one or more agricultural storage bins, each cable having a cable identification and a plurality of the condition sensors supported thereon, preferably the controller is arranged to retrieve the respective cable identification in association with each sensed condition of the sensor condition data.

When the mobile computer device has a display and a memory, preferably the program includes instructions for either displaying the retrieved sensor condition on the display of the mobile computer device, or storing the retrieved sensor condition on the memory of the mobile computer device.

When the mobile computer device further includes an antenna for communication with a remote server over a wireless network, preferably the program also includes instructions which enables transmitting the retrieved sensor condition from the mobile computer device to the remote server over the wireless network.

Preferably the mobile computer device comprises a smartphone and the wireless network includes a cellular network.

Although the interface may comprise a wireless interface such as a transceiver in some embodiments, in the illustrated embodiment, the interface of the adapter preferably comprise a wire harness for making a wired connection between the adapter and the mobile computer device.

When the adapter is powered by an internal battery of the adapter, preferably the adapter is arranged to be powered on responsive to a power up instruction from the program on the mobile computer device received through the wired connection between the adapter and the mobile computer device.

In the preferred embodiment, the wire harness comprises a headphone pin arranged to form a mating connection with a headphone jack of the mobile computer device. In this instance, the program preferably includes instructions for transmitting data from the mobile computer device to the adapter using an output channel of the headphone jack of the mobile computer device and for receiving data from the adapter to the mobile computer device using an input channel of the headphone jack of the mobile computer device.

Preferably the headphone pin includes a first channel connector for mating with a first output channel of the headphone jack of the mobile computer device, a second channel connector for mating with a second output channel of the headphone jack of the mobile computer device, a third channel connector for mating with an input channel of the headphone jack of the mobile computer device, and a ground connector for making a grounded connection with the headphone jack of the mobile computer device for providing a common ground to the other connectors.

In this instance, the controller of the adapter may be operable in a powered down state in which the controller monitors the first output channel of the headphone jack using the first channel connector for changing the adapter to a powered up state in response to receiving a power up instruction from the program on the mobile computer device over the first output channel. When in the powered up state, the controller of the adapter preferably monitors the second output channel using the second channel connector for the sampling instruction from the mobile computer device.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
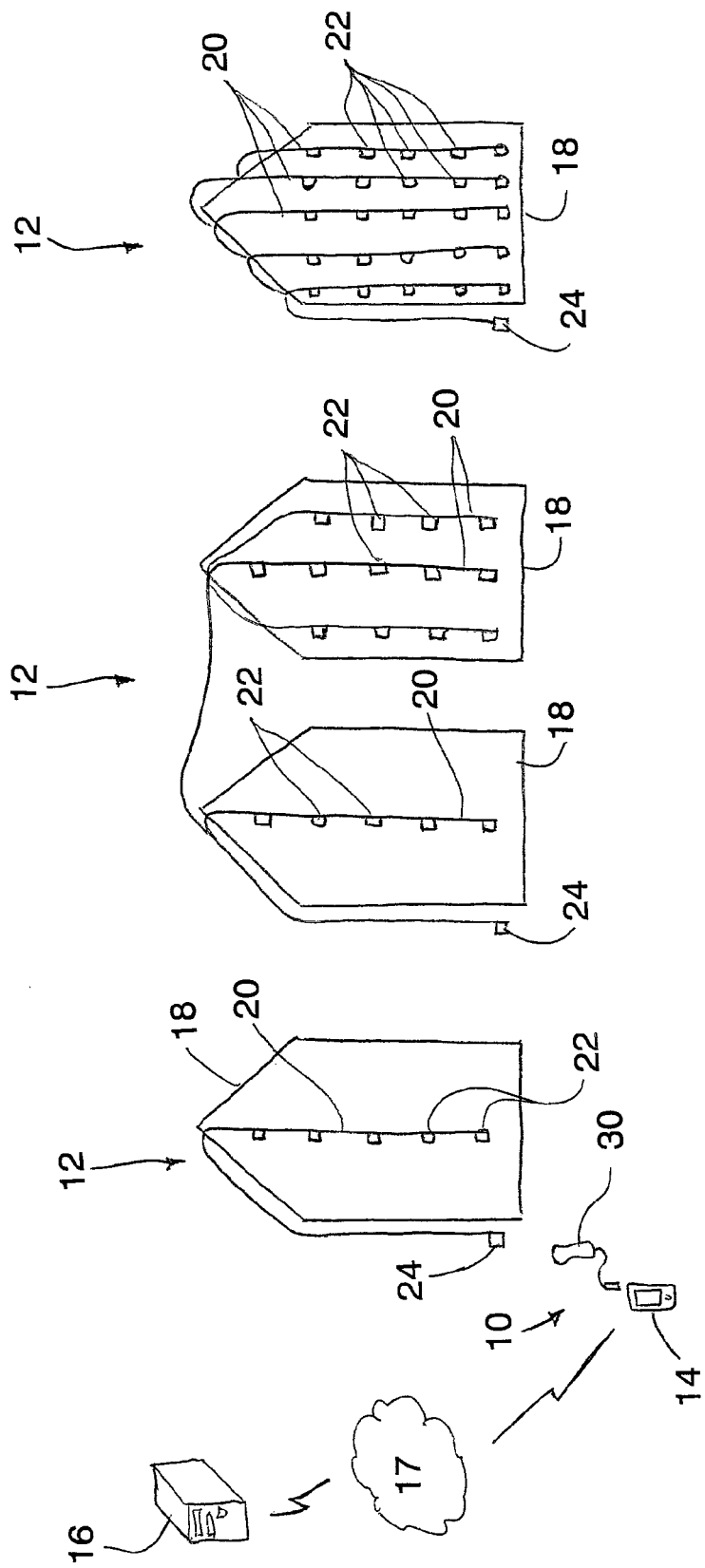
FIG. 1 is a schematic representation of a condition sensor array supported on a plurality of grain bins for communication with the adapter of the present invention.
Figure 2:
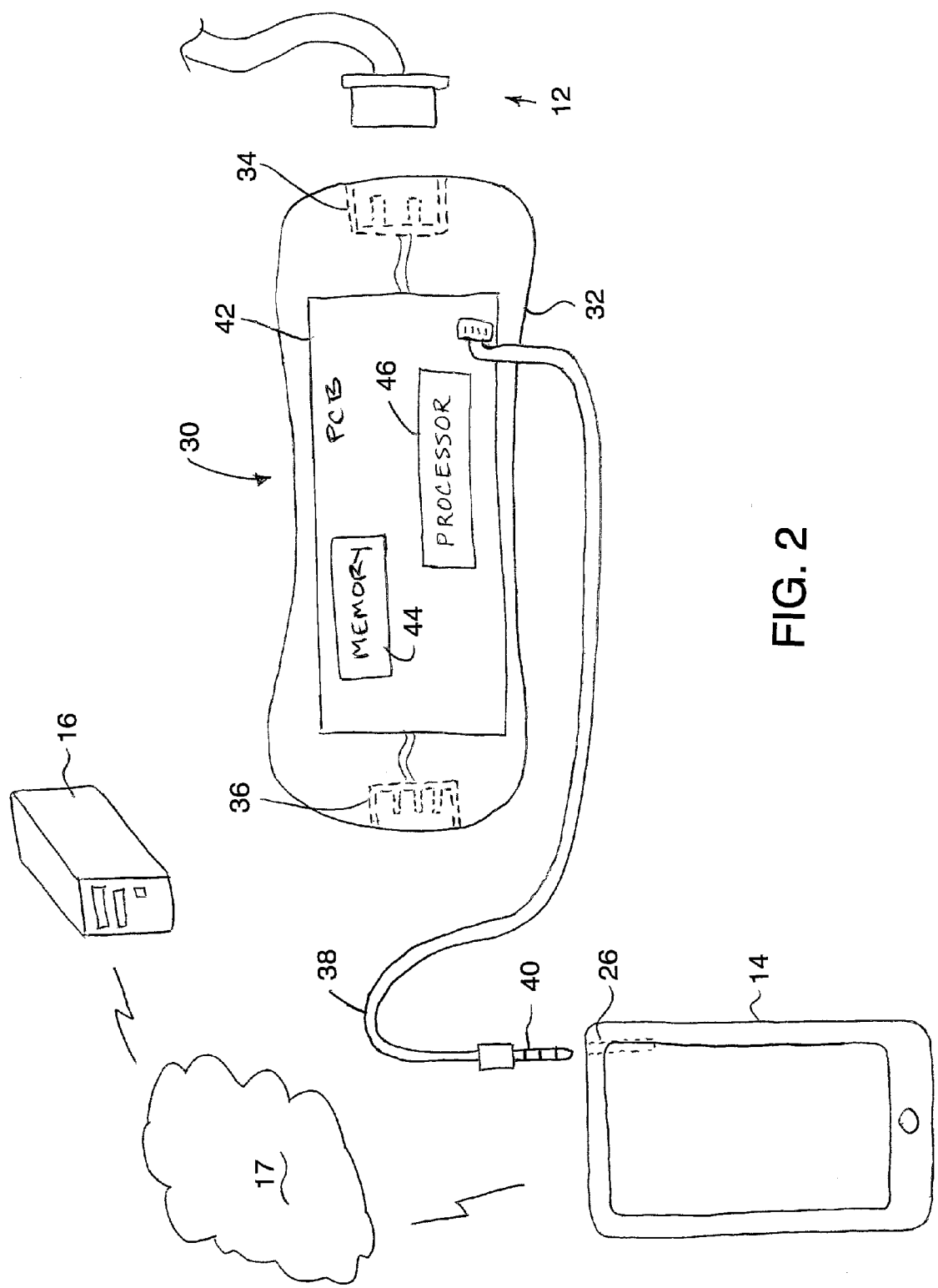
FIG. 2 is a schematic representation of the communication system of the present invention including the adapter, and the remote server with which the mobile computer device can transfer data to which has been retrieved through the adapter from the condition sensor array.

Referring to the accompanying figures there is illustrated a data communication system generally indicated by reference numeral 10. The system 10 is particularly suited for use with an agricultural condition sensing array 12, for relaying sensed condition data from the sensor array to a mobile computer device 14, for example a smartphone. The mobile computer device is typically internet enabled, for example by an antenna for forming a Wi-Fi connection or a cellular network connection which is in turn connected to the internet to permit the mobile computer device to relay the sensed condition data in turn to a remote server 16 in communication with the Internet 17. The remote server may take the form of one or more computer devices distributed across one or more remote locations to execute the functionality described in the following.

Typically, the condition sensor array 12 is associated with one or more grain storage bins 18. Within each bin, one or more cables 20 is suspended vertically to span near the full height of the bin. A plurality of condition sensors 22 are mounted at vertically spaced positions along the cable such that each sensor 22 is supported at a prescribed elevation within the bin and is arranged to sense one or more prescribed conditions at the respective location within the bin, such as moisture content, temperature, carbon dioxide levels and the like.

Each condition sensor is identified by two electronic labels in which one of the labels corresponds to an identification number of the cable with which it is associated, and the second label corresponds to a sensor number associated with that sensor. The sensors are typically numbered consecutively along the length of the cable such that the sensor number identifies a prescribed elevation with which that sensor is associated.

Typically all of the condition sensors of an array spanning one or more cables associated with one or more storage bins collectively communicate with a common cable output 24 using a single wire communication bus line interconnecting the cable output 24 with each of the condition sensors. The cable further comprises a ground line in parallel with the communication bus line in a two position cable configuration. Optionally, in a three position cable configuration, the cable may further comprise an auxiliary power line in parallel with the communication bus line and the ground line. A device connected to the cable output 24 can communicate over the single communication wire with all of the condition sensors using a one wire communication protocol.

The mobile computer device 14 typically comprises a smartphone having a headphone jack 26 of the type comprising two channel speaker outputs, a single microphone channel input, and a grounding connector. In the preferred embodiment, the headphone jack is a four position TRRS style using the Apple protocol. The mobile computer device 14 is further arranged in the typical manner of a smartphone to include an internal printed circuit board having a memory, a processor for executing programs thereon, a user interface for receiving instructions from a user including input keys or a touchscreen for example, and a display for displaying images to the user of the device. In a preferred embodiment, the mobile computer device 14 comprises a smartphone which is further provided with a suitable antenna for communicating over a cellular network to the internet or for communication to the internet through a Wi-Fi network connection for example. The smartphone is thus able to establish connection over the internet 17 with the remote server 16 of the present invention.

The system 10 generally comprises an adapter 30 which communicates between the cable output 24 of the condition sensor array and the mobile computer device 14. The system 10 further includes programming instructions in the form of an application which is loadable onto the mobile computer device and executable on the mobile computer device to enable the various functionalities of the system as described in the following.

The adapter 30 generally comprises a portable housing 32 in the form of a rigid casing which has a first cable port 34 integrally formed at one end of the housing and a second cable port 36 integrally formed at the longitudinally opposed end of the housing. The housing is elongate in the longitudinal direction between the two opposed ports. The housing 32 is generally sized to be suited for gripping in a single hand of the user in an intermediate location between the opposed ports.

The first cable port 34 is suitably sized and shaped for forming a secure mated connection with the cable output 24 of the condition sensor array in the instance of a two position cable by including two connecting pins therein. Alternatively, the second cable port 36 is suitable sized and shaped for forming a secure mated connection with the cable output 24 of the condition sensor array in the instance of a three position cable by including three connecting pins therein.

The adapter further includes a printed circuit board internally within the housing in connection with the first cable port 34 and the second port 36 respectively. The printed circuit board 42 further includes a memory 44 for storing programming instructions and data thereon and a processor 46 which provides the function of a controller.

A wire harness 38 is further provided in the form of a four wire cable having an inner end forming a four pin connection with the printed circuit board 42 within the casing of the adapter, an outer end external of the rigid casing of the adapter and an elongate flexible portion extending through the casing between the inner end and the outer end thereof. A headphone pin 40 is supported on the outer end. The headphone pin defines first, second, third, and fourth electrically isolated connectors along the pin in communication with respective ones of the four wires within the cable. The four electrically isolated connectors of the headphone pin 40 are arranged for communication with the two channel output, the single channel input, and the ground connector of the headphone jack 26 of the mobile computer device 14 respectively.

The controller executes the functionality of the programming, establishes a connection with the condition sensor array through the cable port and establishes communication with the mobile computer device 14 using the wire harness 38 forming a wired connection between the headphone jack of the mobile computer device 14 and the device port 36 of the adapter which is in turn connected to the printed circuit board.

The connection of the controller of the adapter with the selected one of the first or second cable ports provides the function of a sensor receiver for communicating with the condition sensors of the sensor array when the selected cable port forms a wired connection with the condition sensor array. The three position cables still use the one wire protocol but simply are sending an extra power conductor up to leap frog the first group of cables and power the second group of cables. This is only used to accommodate multiple groupings of cables when connected where the total power draw may bring down the line enough on a single power conductor to not be able to read all cables.

The connection of the controller to the device port provides the function of a communication interface which acts to both receive instructions from the mobile computer device to the controller of the adapter and to communicate sensed condition data from the controller to the smartphone.

The typical use of the system 10 begins with the user accessing the executable application on their smartphone. With the adapter device connected to the cable output 24 and the headphone pin 40 of the adapter connected to the headphone jack of the smartphone, the application sends an initial signal from the smartphone to the adapter to power up the electronics of the adapter using an internal battery within the adapter.

Depending upon the selected mode, by one of various means, the smartphone sends a data sampling instruction to the adapter which in turn samples sensed condition data from the condition sensors of the sensor array using a one wire communication protocol between the adapter and the condition sensors. The sensed condition data is returned to the adapter together with the identification of the cable using both the sensor label and cable label to identify each sensor and the associated cable together with the associated sensed condition relative to the entire sensor array. The adapter further responds to the instructions from the smartphone by returning the sensed condition data together with the sensor identification data associated therewith back to the smartphone.

Depending on the configuration, the smartphone can store the sensed data locally on the smartphone itself to enable the data to be immediately displayed or recalled from memory storage at a later date for display. Optionally, the programming can be arranged by the user to further relay the sensed condition data from the smartphone through the cellular network and/or the internet to the remote server of the system.

The remote server includes a web based user interface such that a user of the system can access the remote server through any internet enabled device, and then subsequently access their respective sensed condition data upon meeting prescribed user authentication protocols. The user can execute the application on the smartphone in a guest mode to simply read data and not store, or more preferably, they can create a user profile on the remote server for transferring and storing data to the remote server. Users can log limited information on their device, but would typically be provided with full access to haul sensed condition data including historical profiles if they established a user profile on the remote server and make use of the remote server functionality.

Figure 3:
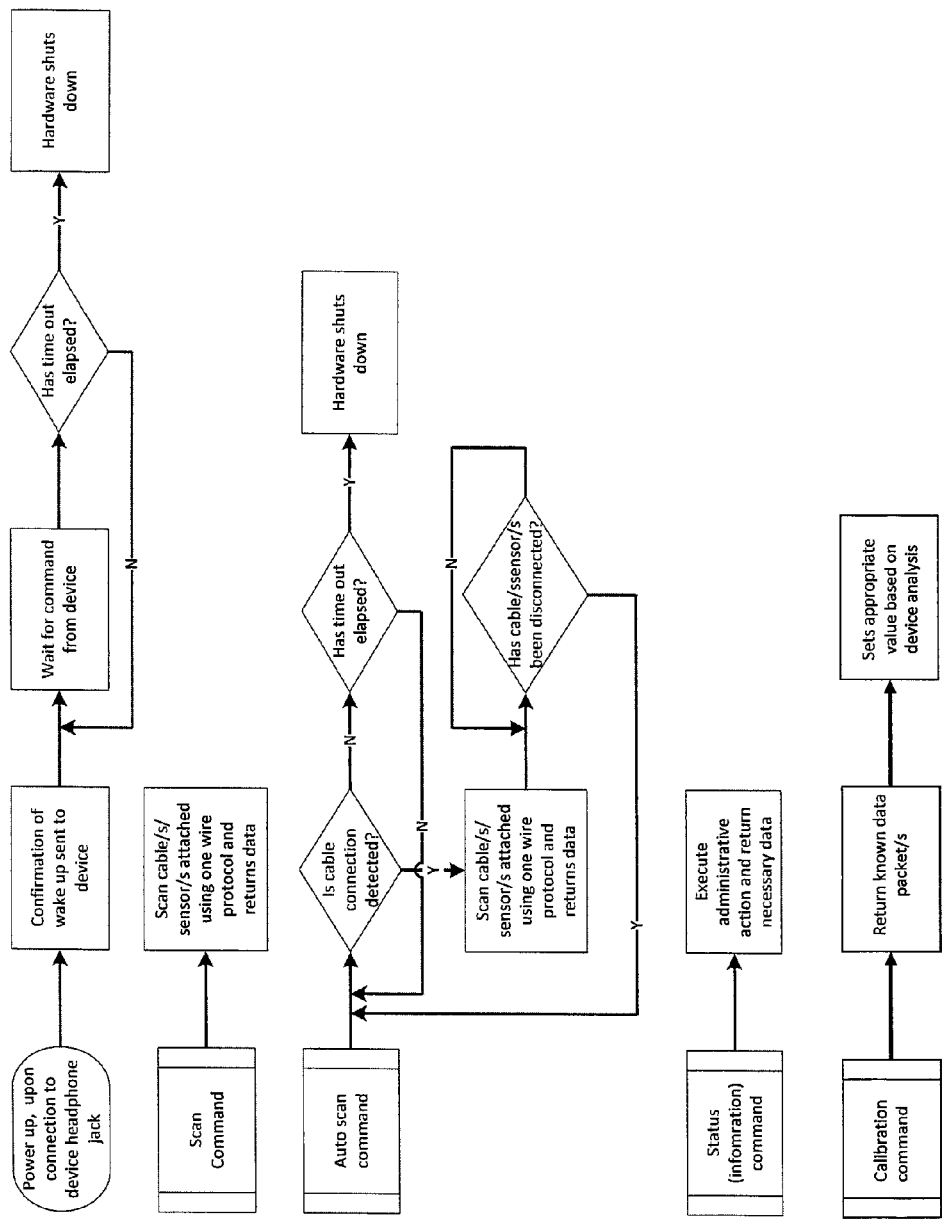
FIG. 3 is a schematic flow chart of various processes executed by the controller within the adapter.

Turning now to FIG. 3, various programming instructions executed by the application on the smartphone for communication with the adapter device will now be described. When the application is executed on the phone, the application uses one of the two channels of the headphone jack outputs to generate a steady power out signal. The controller of the adapter monitors the channel which is dedicated to the power out signal which in turn allows the full functionality of the adapter device to be powered up on its own battery power in response to the power up signal received from the smartphone.

Upon powering up, confirmation is sent back from the adapter device as a suitable audio input signal into the microphone input channel of the headphone jack of the smartphone. The adapter device then remains in a ready state waiting for further instructions from the application on the smartphone. If no instructions are received within a prescribed period of time, then the adapter device will return to a sleep mode and remain in the sleep mode until a new power up signal is received from the application on the smartphone through the dedicated power up channel of the headphone jack. The connection between the grounding connector of the headphone pin and headphone jack provide a grounding function for the input and output signals noted above.

In some instances, the user may manually request scanned data by initiating a scan command from the application of the smartphone. The application then sends a sampling instruction through the wire harness 38 from the smartphone to the adapter. The adapter then scans one or more sensors of one or more cables which are attached to the cable output forming a wired connection with the adapter using one wire protocol and returns the data to the adapter which then returns data to smartphone.

In a further mode of operation, the application may execute an automated scanning mode in which connection of the adapter to the sensor array is sufficient to initiate sampling of sensed condition data. In this instance, the smartphone application instructs the adapter to continuously monitor if a cable is connected. If no cable is connected for an elapsed period of time, the adapter will simply power down. If a cable is connected within the prescribed time limit, the adapter will again sample sensed data from the condition sensors provided the cable remains connected to return the sensed data to the smartphone.

Independent of sampling instructions, the application on the smartphone can also initiate various additional instructions including relaying executive administrative actions from the smartphone to the controller of the adapter and returning necessary data from the adapter to the smartphone in response to the instruction. In one example, the smartphone sends a battery monitoring instruction to the controller of the adapter which then monitors the battery level and returns a measured value to the smartphone. In other instances, a user may simply wish to identify what cables are connected to the adapter in the instance of multiple cable outputs provided in proximity to one another. In this instance, one of the cable outputs is connected to the adapter and the smartphone sends an instruction to the adapter to sense what cable identification is connected to the adapter and return the identification to the smartphone.

In further instances, the smartphone application may request identification as to what software updates have been performed on the adapter and any software updates which have not yet been incorporated can then be subsequently transferred from the smartphone to the adapter as required.

In a further mode of operation, the application can be executed on the smartphone to perform a calibration with the adapter device. More particularly different signal strengths and data transmission rates can be sampled by sending data from the smartphone to the adapter device to request that the adapter device return known data packets of prescribed data from the adapter back to the smartphone. After several exchanges of information, an appropriate signal strength and data transfer rate can be selected automatically by the programming to optimize battery usage and data transfer rates while minimizing errors related to data transmission.

As described above, the adapter is arranged to communicate with the condition sensors of the condition sensing array using a one wire communication protocol.

The communication between the adapter device and the handheld mobile device in the illustrated embodiment relies on the wiring harness which includes the headphone pin 40 for communication with the channels of the headphone jack of the smartphone. Although in further embodiments, the adapter may communicate with the mobile computer device 14 by other means, including wireless signals such as Wi-Fi or Bluetooth for example, further details with regard to the preferred embodiment using the wire harness 38 incorporating a headphone pin 40 will now be described in further detail.

Power control of handheld: A strong signal (currently a 1 KHz sine wave) is continuously generated on the headphone output's right channel that is conditioned by the handheld to control a digital enable pin on the power supply chip. After a few hundred milliseconds of receiving this signal, the digital enable pin is taken over by the handheld to keep itself powered on. The signal produced on the headphone output is then disabled. This allows the handheld to turn itself off after a period of inactivity and prevents the power control circuitry from relying on the steady and continuous output of this signal.

Data into handheld: Data is sent to the handheld through the headphone output's left channel. This audio output emulates a UART (Universal Asynchronous Receiver/Transmitter) signal at 4800 bps (bits per second) with eight data bits, one start bit and one stop bit. The audio signal attempts to generate square waves at voltages much lower than standard TTL (Transistor-Transistor-Logic) and inverted to the required format required by the UART protocol. This signal is conditioned by the handheld. An operational amplifier circuit boosts this signal to a much higher level that triggers a FET (Field Effect Transistor) with a fairly high gate-source voltage requirement. The slew rate of the operational amplifier is high enough that this jump in voltage can be tracked with a very small amount of lag. The FET is a fast device that toggles the signal between 0 volts and the system voltage (2.8 volts) in an inverting manner to how it was presented on the headphone output channel. This conditioned signal matches the required TTL levels that the CPU (Central Processing Unit) will accept as standard UART data. The data rate is always 4800 bps at startup but can be changed at run time through commands sent to the handheld. Some headphone outputs on various phones and tablets generate better signals based on the audio hardware in them and so it is possible to speed up the communication rate on some devices in order to move more data in less time. Data is passed to the handheld in packets with an assigned protocol consisting of commands, data fields and checksums (for error checking). Error checking is done through verification of packet lengths and confirmation of valid checksums. Error handling is done through timeout periods and retries on the host device (phone, tablet, etc.).

Data out of handheld: Data is sent out of the handheld on the microphone input pin of the headphone connector. Different phones and tablets are more sensitive to the voltage presented on this pin due to DC bias and offset that can be generated by the interface hardware of each device. The handheld has the ability to control the peak amplitude of the signal it presents on this interface in order to support more devices. There is a calibration procedure in the handheld that tries voltages over the supported voltage range and attempts to find the level that provides the lowest data failure rate. Each voltage output in the full range corresponds to a specific 8-bit data value. The successful value is stored in non-volatile memory so that it can be used every time the handheld is turned on and calibration does not need to be repeated. This value can also be uploaded to Intragrain servers in order to generate a table of values and the hardware it supports. This allows the host software to 'learn' how to support each device and eliminates the need for customers to do a manual calibration if their device is already on the list. As new phones and tablets are released, each customer with the new device has to complete the calibration procedure and the resulting data value ends up aiding future customers from having to do the same. Data is returned to the host through packets with an assigned protocol consisting of commands, data fields and checksums (for error checking).

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A data communication system for communication between a mobile computer device and a condition sensor array comprising at least one condition sensor received within an agricultural storage bin for sensing a condition at a respective location of the condition sensor, the system comprising:
   an adapter comprising:
      a portable housing;
      a port on the housing adapted to form a releasable wired connection to the condition sensor array;
      a sensor receiver in connection with the port for communicating with said at least one condition sensor of the sensor array;
      an interface on the housing for communicating with the mobile computer device;
      a controller which is operatively connected to:
         i) the sensor receiver for retrieving the sensed condition data from said at least one condition sensor through the sensor receiver; and
         ii) the interface for receiving instructions from the mobile computer device and for transmitting the sensed condition data from the controller to the mobile computer device; and
      an internal battery within the portable housing of the adapter for providing power to the controller; and
   a program loadable onto and executable by the mobile computer device so as to generate a power up instruction and a sampling instruction by the mobile computer device;
   the controller of the adapter being operable in a powered down state in which the controller only monitors for a connection to the mobile computer device and a powered up state in which the controller is receptive to operating instructions from the mobile computer device to communicate with the condition sensor array;
   the controller being arranged to change from the powered down state to the powered up state only in response to the power up instruction from the mobile computer device; and
   the controller of the adapter being arranged to retrieve the sensed condition data from said at least one condition sensor and to transmit the sensed condition data to the mobile computer device only in response to the sampling instruction generated by the mobile computer device subsequent to being changed into the powered up state by the power up instruction.

2. The system according to claim 1 for use with a sensor array comprising a cable suspended within the agricultural storage bin having a plurality of the condition sensors supported thereon and a connector at an output end of the cable in communication with each of the condition sensors, wherein the port on the housing of the adapter is arranged for forming a releasable mating connection with the connector of the sensor array.

3. The system according to claim 1 for use with a sensor array comprising a plurality of the condition sensors, each having a respective sensor identification, wherein the controller is arranged to retrieve the respective sensor identification in association with each sensed condition of the sensor condition data.

4. The system according to claim 3 for use with a sensor array comprising a plurality of cables suspended within one or more agricultural storage bins, each cable having a cable identification and a plurality of the condition sensors supported thereon, wherein the controller is arranged to retrieve the respective cable identification in association with each sensed condition of the sensor condition data.

5. The system according to claim 1 for use with a mobile computer device having a display, wherein the program includes instructions for displaying the retrieved sensor condition on the display of the mobile computer device.

6. The system according to claim 1 for use with a mobile computer device having a memory, wherein the program includes instructions for storing the retrieved sensor condition on the memory of the mobile computer device.

7. The system according to claim 1 for use with a mobile computer device having an antenna for communication with a remote server over a wireless network, wherein the program includes transmitting instructions generated by the mobile computer device for transmitting the retrieved sensor condition from the mobile computer device to the remote server over the wireless network.

8. The system according to claim 7 wherein the mobile computer device comprises a smartphone and the wireless network includes a cellular network.

9. The system according to claim 1 wherein the interface of the adapter comprises a wire harness for making a wired connection between the adapter and the mobile computer device.

10. The system according to claim 9 wherein the wire harness comprises a headphone pin arranged to form a mating connection with a headphone jack of the mobile computer device and wherein the program includes instructions for transmitting data from the mobile computer device to the adapter using an output channel of the headphone jack of the mobile computer device and for receiving data from the adapter to the mobile computer device using an input channel of the headphone jack of the mobile computer device.

11. The system according to claim 10 wherein the headphone pin includes a first channel connector for mating with a first output channel of the headphone jack of the mobile computer device, a second channel connector for mating with a second output channel of the headphone jack of the mobile computer device, a third channel connector for mating with an input channel of the headphone jack of the mobile computer device, and a ground connector for mating with a ground connector of the headphone jack of the mobile computer device.

12. The system according to claim 11 wherein the controller monitors the first output channel of the headphone jack using the first channel connector for changing the adapter to the powered up state in response to receiving the power up instruction from the program on the mobile computer device over the first output channel, and wherein in the powered up state the controller of the adapter monitors the second output channel using the second channel connector for the sampling instruction from the mobile computer device.

13. A method of communicating between a mobile computer device and a condition sensor array comprising at least one condition sensor received within an agricultural storage bin for sensing a condition at a respective location of the condition sensor, the method comprising:

providing an adapter comprising a portable housing, a communication port capable of forming a wired connection with the condition sensor array, a sensor receiver in connection with the port, an interface on the housing, a controller which is operatively connected to sensor receiver and the interface in which the controller is operable in a powered down state in which the controller only monitors for a connection to the mobile computer device and a powered up state in which the controller is receptive to operating instructions from the mobile computer device to communicate with the condition sensor array;

providing a program loadable onto and executable by the mobile computer device such that the mobile computer device is arranged to generate a power up instruction and a sampling instruction;

forming a wired connection between the communication port of the adapter and the condition sensor array;

executing the program on the mobile computer device so as to communicate the power up instruction generated by the mobile computer device from the mobile computer device to the controller of the adapter so as to change the adapter from the powered down state to the powered up state, followed by the sampling instruction from the mobile computer device to the controller of the adapter through the interface; and using the controller of the adapter in the powered up state to retrieve the sensed condition data from said at least one condition sensor through the communication port and transmitting the sensed condition data from the controller to the mobile computer device using the interface in response to receiving said sampling instruction generated by the mobile computer device.

14. The method according to claim 13 for use with a remote server wherein mobile computer device includes an antenna for communication with the remote server over a wireless network, the method including transmitting the retrieved sensor conditions from the mobile computer device to the remote server over the wireless network responsive to transmitting instructions generated by the program executed on the mobile computer device.

15. The method according to claim 13 further comprising:

executing the program on the mobile computer device to change the adapter from the powered down state to the powered up state prior to forming the wired connection between the communication port of the adapter and the condition sensor array; and instructing the adapter to retrieve the sensed condition data from said at least one condition sensor responsive to forming the wired connection between the communication port of the adapter and the condition sensor array.

* * * * *